INVENTOR.
RAYMOND O. WILSON
BY
C. G. Stratton
ATTORNEY

BURRING MECHANISM FOR SCREW-SLOTTING MACHINES

Raymond O. Wilson, San Marino, Calif., assignor to Olympic Screw & Rivet Corporation, Downey, Calif., a corporation of California
Filed Feb. 12, 1962, Ser. No. 172,736
4 Claims. (Cl. 10—6)

This invention relates to mechanism for removing the burrs that ordinarily form when the head of a screw is slotted, said mechanism being provided as a component of a screw-slotting machine.

An object of the present invention is to provide, in a machine that moves screws in an arcuate path during slotting of the heads thereof, tangential arcuate movement of a burring element and providing for resilient bias of said element against the screw heads during the sliding or wiping movement of said burring element with the burrs on the screw heads.

The present burring mechanism is an improvement of the burring means shown in my pending application entitled Screw-Slotting and Burring Machine, Serial No. 98,615, filed March 27, 1961, issued as Patent No. 3,111,697, November 26, 1963. The present improved device comprises the above-characterized resilient bias that enables the burring element to accommodate itself to variations in the screw heads and size of the burr and insures against tool damage or breakage as may be caused by a too rigid or positive burr-wiping engagement of the tool with the screw heads. Also, undue marring of the screw heads is obviated by the more yielding interengagement of the burring tool and said heads that is a function of the present improvements.

This invention also has for its objects to provide such means that are positive in operation, convenient in use, easily installed in a working position and easily disconnected therefrom, economical of manufacture, relatively simple, and of general superiority and serviceability.

The invention also comprises novel details of construction and novel combinations and arrangements of parts, which will more fully appear in the course of the following description and which is based on the accompanying drawing. However, said drawing merely shows, and the following description merely describes, one embodiment of the present invention, which is given by way of illustration or example only.

In the drawing, like reference characters designate similar parts in the several views.

Figure 1:
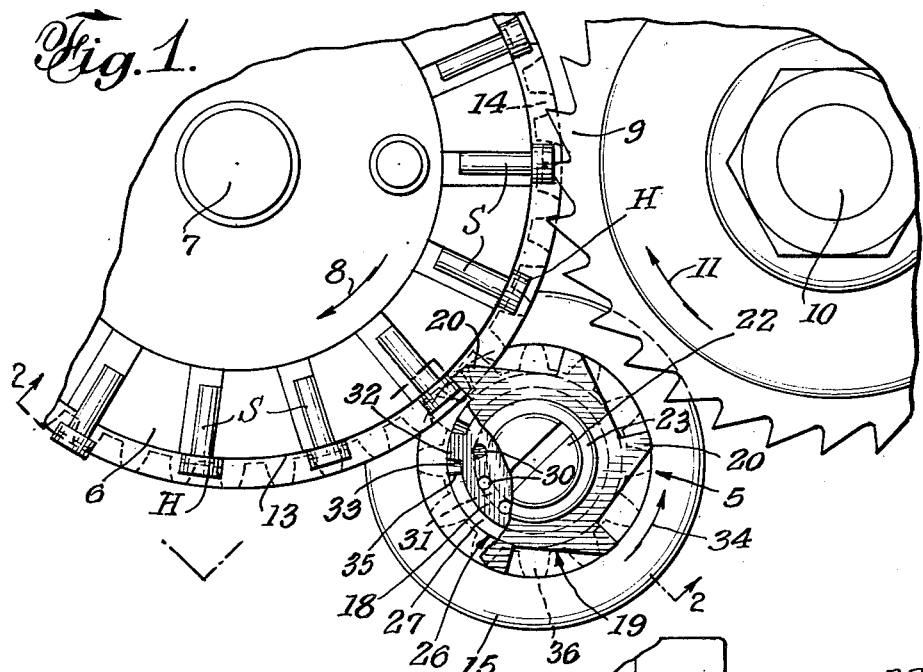
FIG. 1 is a fragmentary plan view showing the present burring means in operative association with screw-moving means and slot-cutting means.
Figure 2:
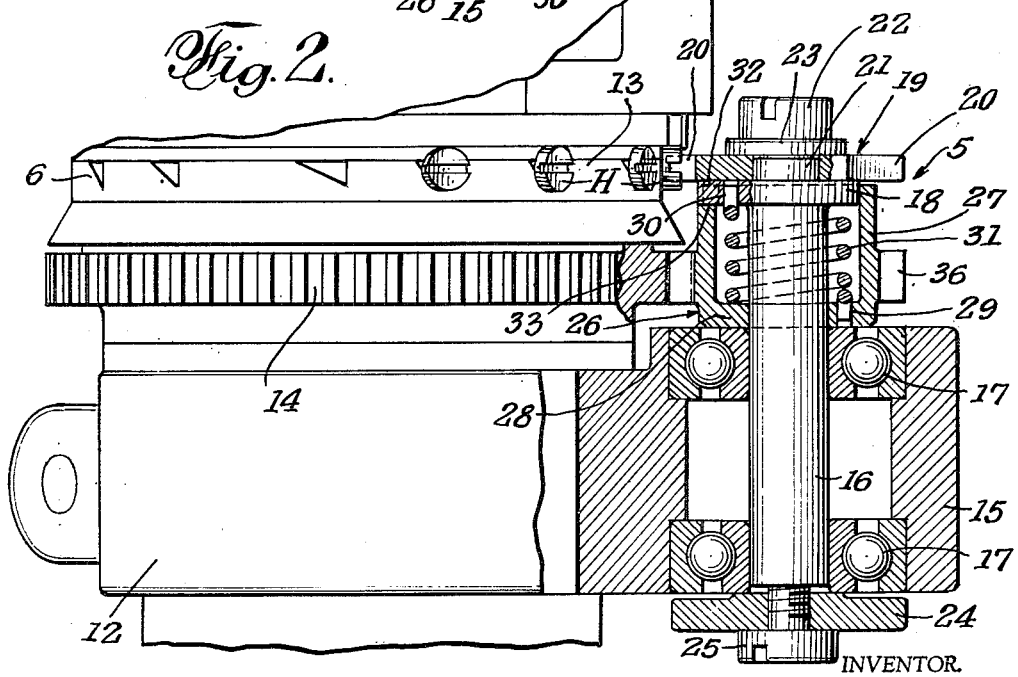
FIG. 2 is a vertical sectional view as taken on the line 2—2 of FIG. 1.

The present burring means 5 is shown in operative association with a screw-carrier head or turret 6 that is rotated around the axis 7 in the direction of arrow 8, a screw-slotting cutter 9 rotated around the axis 10 in the direction of arrow 11, and a bracket 12 that carries the burring means 5 and is mounted for adjustment around the axis 7. The above generally described means is shown in full detail in said pending application and is here shown for the purpose of setting the environment for the means 5 which comprises the novel means of the present invention.

It will be clear that the head 6 carries radially disposed screws S with the heads H thereof extending beyond the peripheral face 13 of said head and in bearing engagement with said face. It will also be clear that the cutter 9 moves in a direction counter to the movement of the screws. Therefore, the teeth of said cutter will slot said heads so that any burrs that may be formed, form where the cutter teeth leave the slots—on the trailing sides of the heads. The present burring means 5 engages the burred sides of said heads and is driven by a driven gear 14 on the head 6 in such ratio that said means 5 slides or wipes along the heads to dislodge the burrs thereon.

The present burring means 5 comprises a bearing extension 15 on the bracket 12, a stud 16 mounted in antifriction bearings 17 in said extension 15, an annular flange 18 formed on the stud 16 where the same extends beyond the bracket extension, a burring cutter 19 having radially arranged burring arms 20 mounted on said flange and centered on the axis of said stud 16 by a pilot extension 21, and a cap screw 22 with a washer 23 thereunderneath connected to the end of the stud to firmly lock the cutter 19 to the stud, at its opposite end, is provided with a retaining disc 24 that is clamped to the adjacent bearing 17 by a cap screw 25 that is threadedly engaged with the latter end of the stud. Tightening of screw 25 draws the stud 16 and the cutter 19 thereon in an endwise direction toward the bracket extension 15.

The stud 16 extends axially through a cup-like member 26 with the flange 18 of said stud loosely fitting within the cylindrical wall 27 of said member which is provided with a base wall 28 that has a hole 29 therein. The stud flange 18 is provided with a plurality of circumferentially arranged holes 30. A helical spring 31 within the member 26 between the wall 28 thereof and the stud flange 18 has one end engaged in hole 29 and the other end in one of the holes 30, it being clear that the tension or bias of said spring in a counter-clockwise direction, as viewed in FIG. 1, may be varied according to the hole 30 selected for the spring end, providing the member 26 is held against rotation relative to the stud 16. Such holding means is here shown as a radial lug 32 on the flange 18, and a slot or notch 33 in the end of wall 27 of member 26. In this case, said notch is wider than the lug, as shown in FIG. 1, and the spring 31 is wound to impose a bias on the cutter 19 in the counter-clockwise direction of the arrow 34. As a consequence, the normal position of lug 32 is in abutment with the end 35 of the notch 33.

It is in the direction of arrow 34 that the gear 14 rotates the member 26 by means of the pinion gear teeth 36 on said member.

When an arm 20 of the burring cutter 19 approaches a head H to be burred, the lug 32 is against the slot end 35. As said arm archieves contact with the screw head, actually with the burr thereon, the cutter is retarded due to the resilience of its connection with the positively rotated member 27. Thus, the cutter arm 20 has a resilient engagement with the head H that causes retraction of the lug 32 away from the abutment end 35 in proportion to the size of the burr and also any slight inequalities there may be in said head. Now, as the cutter arm 20 wipes over the burr to remove the same, the action is resilient and is, therefore, neither marring to the head nor damaging to the tool. When the burring arm loses contact with the head, the spring 31 returns the lug 32 into abutment with end 35. Thus, the next oncoming burring arm 20 causes the above burring operation to be repeated on the next screw head on the turret head 6.

While the foregoing has illustrated and described what is now contemplated to be the best mode of carrying out the invention, the construction is, of course, subject to modification without departing from the spirit and scope of the invention. Therefore, it is not desired to restrict the invention to the particular form of construction illustrated and described, but to cover all modifications that may fall within the scope of the appended claims.

Having thus described this invention, what is claimed and desired to be secured by Letters Patent is:

1. Means to remove the burrs on the trailing ends of slots cut in the heads of screws moving in an arcuate path with the screw heads directed radially outward, said means comprising:
   (a) a positively rotationally driven cup member can an axis normal to the plane of said arcuate path,
   (b) a stud coaxial with said cup member and having an end closing the open end of the cup,
   (c) a lost-motion connection between the cup and stud,
   (d) a spring in the cup member connecting the cup and stud and imposing a resilient bias on and urging the stud to rotate in the same direction as that of the driven cup, and
   (e) a cutter having a plurality of radial burring arms affixed to the stud above the cup in overlapping tangential relation to the mentioned arcuate path and in burr-removing wiping engagement with the trailing ends of the slots.

2. Means according to claim 1 in which the end of the stud that closes the cup comprises a flange and the cup has a tubular wall, and the lost-motion connection comprises a radial extension on said flange and circumferentially spaced abutments for said extension formed in the tubular wall of the cup.

3. Means according to claim 2 in which the stud flange has a plurality of circumferentially arranged holes adjacent its periphery, and the mentioned spring has a stud-connected end that is in selective engagement with said holes to vary the tension on the spring.

4. In a screw-slotting machine in which screws are moved in an arcuate path with their slotted heads radially directed and the burrs formed on the trailing sides of the heads by slotting of the heads,
   (a) a bearing extension,
   (b) a stud rotationally mounted in said bearing extension,
   (c) a positively driven cup member coaxially mounted on said stud, supported by its bottom on the bearing extension and rotational relative to the stud,
   (d) a flange integral with the stud and closing the open end of the cup,
   (e) a lost-motion connection between said stud and cup member,
   (f) a helical spring disposed within the cup member around the stud with one end connected to the cup bottom and the other end adjustably connected to the stud flange, and
   (g) a cutter having a plurality of radial burring arms adjustably fixedly mounted on said stud above the flange thereof to enable burr-removing engagement of said arms with the trailing sides of successive screw heads,
   (h) the spring being biased to resiliently urge said cutter arms to such engagement to allow the cutter to engage and remove burrs that vary in size from one screw head to the next.

References Cited by the Examiner
UNITED STATES PATENTS

| | | | |
|---|---|---|---|
| 1,431,401 | 10/22 | Hupp | 64—15 |
| 2,184,394 | 12/39 | Moretti | 10—135 |
| 2,741,784 | 4/56 | Fray | 10—6 |
| 2,762,064 | 9/56 | Byam et al. | 10—6 |
| 3,111,697 | 11/63 | Wilson | 10—6 |

ANDREW R. JUHASZ, *Primary Examiner.*
CARL W. TOMLIN, WILLIAM W. DYER, JR.,
*Examiners.*